United States Patent [19]

Ilgner et al.

[11] 4,435,849
[45] Mar. 6, 1984

[54] OPTICAL TRANSMISSION SYSTEM

[75] Inventors: Herwig Ilgner, Rosbach; Utz W. Barth, Frankfurt, both of Fed. Rep. of Germany

[73] Assignee: Hartmann & Braun AG, Frankfurt, Fed. Rep. of Germany

[21] Appl. No.: 238,987

[22] Filed: Feb. 27, 1981

[30] Foreign Application Priority Data

Mar. 1, 1980 [DE] Fed. Rep. of Germany ....... 3007958

[51] Int. Cl.³ .............................................. G02B 5/14
[52] U.S. Cl. .................................... 455/601; 455/608
[58] Field of Search .............. 455/601, 606, 607, 608; 385/76

[56] References Cited

U.S. PATENT DOCUMENTS

4,166,946  9/1979  Chown et al. ..................... 455/601
4,236,256 11/1980  Brackett et al. ................... 455/608

Primary Examiner—Howard W. Britton
Assistant Examiner—Edward L. Coles

[57] ABSTRACT

An optical information-bearing signal is regenerated by branching a portion off that signal while the remaining portion permanently bypasses the regeneration. The branched-off portion is converted into an electrical signal which is processed to regenerate, at a higher power level, the information in a manner which is dynamically invariant to a wide range of input level changes. The regenerated signal is superimposed upon the passed-through signal. A three-signal level encoding scheme is employed and the regeneration involves referencing the branched-off portion electrically against two thresholds in a manner which maintains a constant amplitude relation between the thresholds and the arithmetic average of the electrical signal representing the branched-off portion. The regenerating units are used in series and designed so that two or more in a row can drop out and still the signal can be regenerated by the next operational regeneration.

14 Claims, 7 Drawing Figures

OPTICAL TRANSMISSION SYSTEM

BACKGROUND OF THE INVENTION

The present invention relates to an optic-electronic transmission system.

European Pat. No. 2 971 discloses a bus system for fiber optics, interconnecting sources and destination units. Also, signal regenerating units are provided which boost the transmitted signal. Such a regenerating unit is really a combination of a destination and a source. Each such participating unit as connected to a fiber is provided with an electrically controllable optical shutter, constructed to ensure that the signal bypasses the unit in the case of failure. In other words, the optical transmission system as a whole must remain operational, even if one of the participating regenerators is down for any reason, as, hopefully, the signal can still be used even without a particular regeneration step. As long as a participating regenerating unit is operational, the bypass is closed, i.e., blocked; the optical signal is received, converted into an electrical signal which, in turn, is regenerated; and the regenerated signal is again converted into an optical signal and passed back into the optical bus.

DESCRIPTION OF THE INVENTION

It is an object of the present invention to provide a new and improved optical-electronic transmission system.

It is another object of the present invention to provide a new and improved fiber-optical transmission system which includes signal regeneration without using optical shutters.

It is a further object of the present invention to improve optical ring busses with plural signal regeneration.

It is a feature of the present invention to provide optical signal transmission on the basis of a three-level code, in which the middle level constitutes at least approximately the average signal level.

It is a related feature of the present invention to reconstitute and regenerate optical signals in which information is encoded by such a code, by branching a portion of the signal to be transmitted off and converting it into an electrical signal. That signal is referenced against two thresholds spread around an arithmetic average signal level. The result of this referencing is a logic signal in each instance to be used to control a trilevel light source whose output is passed back into the transmission.

It is a preferred feature of the invention to provide for dynamic tracking in that the reference processing remains invariant to input level changes. This is accomplished either by causing the thresholds to track the average level of the signal received, or by gain-controlling amplification of the received signal until its average agrees with a set value; the threshold levels are fixed set in relation to that value.

In accordance with the preferred embodiment of the present invention, it is suggested to provide a system in which an incoming optical signal is branched into two portions; one portion is converted into an electrical signal which is referenced against threshold levels in a dynamic, rangetracking manner in order to obtain logic signals which control a light source. The light from this source is combined with the other portion of the incoming signal and passed on. In the case of failures, only this other portion is passed on; it is never blocked for any reason.

In the case of a three-level optical signal, two thresholds are used, and the electrical signal is referenced against them in order to distinguish among the three cases. Preferably, a two-bit output logic signal is used to differentiate among these three cases in such a manner that none, one, or two current sources are added to a permanent current source driving the light source.

It is a further feature of the invention that the signal regenerating unit can be mode-controlled in order to operate in the regenerating mode as described; in a receiving mode with no output being produced; or in the transmit mode in which the input is ignored and a new signal is passed into the system. This is particularly possible as the passedthrough signal portions experience a definite attenuation.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Figure 1:
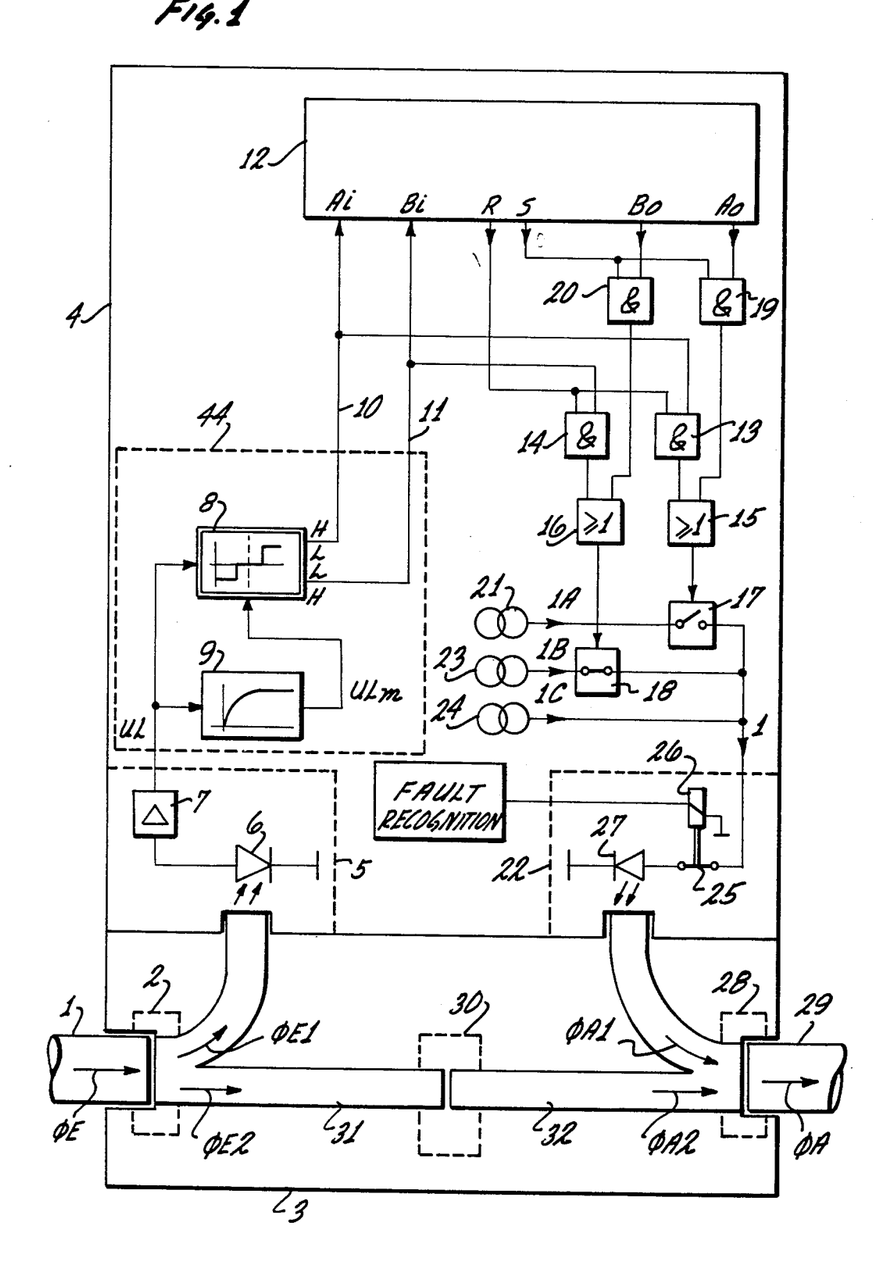
FIG. 1 is a block and system diagram of a signal-regenerating unit in accordance with the preferred embodiment of the invention for practicing the best mode thereof.

Proceeding now to the detailed description of the drawings, FIG. 1 shows an end portion 1 of a fiber optic bus connected to the optical portion 3 of a signal regenerating unit, using an optical coupler or socket 2, e.g., of the plugin type as far as the fiber end is concerned. The arrow here is indicative of an arriving optical information signal $\phi E$.

The optical portion 3 includes a first branching fiber device 31 having an input window which is part of coupler 2 and is, therefore, optically coupled to the end 1 of the fiber bus. The branching unit has a straight portion which is coupled to a similar portion of a second branching unit 32 which, however, is better being termed a combining unit. These two portions are optically coupled together by a coupling unit 30. Thus, unit 3 provides for a straight-through optical transmission of a portion $\phi E2$ of the optical signal $\phi E$, that portion being $\phi A2$ in combining unit 32. This through-transmission is a permanent one and is not affected by any operation in an electric-optical regenerator 4.

The optical signal $\phi E$, arriving at bus end 1, is attenuated by the coupler 2, by about 1 dB, and is branched into two similar portions $\phi E1$ and $\phi E2$. As stated, the portion $\phi E2$ is transmitted via coupler 30 to the straight portion of the optical combining unit 32 and experiences a 1 dB loss in coupler 30. The signal $\phi E2$, moreover, is 3 dB down from the signal ($\phi E-1$ dB) just prior to branching. The optical combining unit 32 is coupled to the continuation 29 of the optical bus by means of a coupler 28.

The curved portion of branching unit 31 feeds its optical signal $\phi E1$ to a receiver 5 of the electronic portion 4 of this particular regenerating unit. A similarly curved portion of combining unit 32 receives radiation $\phi A1$ from a transmitter 22 in unit 4, to be combined with the through-transmitted signal $\phi A2$. Signal $\phi A2$ denotes the composite optical output being passed into bus continuation 29.

The receiver 5 includes an optical-electrical transducer 6 being a semiconductive device which generates an electrical signal in proportion to its optical input $\phi E1$. An amplifier 7 provides the proportional voltage UL. The voltage UL is fed to a three-level processing circuit 8 as well as to a delay device 9 which, in effect, generates the arithmetic average $UL_m$ of the time-variable signal UL. The signal and code format used here consists of three levels: an intermediate level which, at least approximately, coincides with the arithmetic average of the signal as a whole; an upper level; and a lower level; (see FIG. 3, middle diagram).

The three-level circuit 8 has an upper threshold value $UL_u$ and a lower threshold value $UL_l$. These two threshold levels bear a fixed relation to the average signal $UL_m$ in that the latter is situated in between the two threshold levels. Moreover, the upper threshold is selected and controlled (infra) to be safely below the upper information signal level, and the lower threshold is safely above the lower information signal level, as they are expected to occur. The three-level circuit 8 has two outputs, $A_i$ and $B_i$, which furnish bivalue signal levels in accordance with the following equations:

TABLE

|  | $A_i$ | $B_i$ |
|---|---|---|
| $UL < UL_l$ | L | H |
| $UL_l < UL < UL_u$ | L | L |
| $UL < UL_u$ | H | L |

These three sets of logic conditions or bivalue bit combinations, thus, establish a logical representation of the three different information signal levels. These outputs are respectively set by circuit 8 into the two lines 10 and 11. The two threshold levels are not fixed, but are shifted up or down with the detected average level $UL_m$, preferably in a manner that allows $UL_m$ to remain in the middle between the two threshold levels. Thus, the detection for the information signal is dynamically adapted to variations in input signal level conditions.

A mode and information control for the system is provided by a circuit 12. This circuit has four outputs R, S, $B_o$ and $A_o$. Circuit 12 receives also the signals $A_i$ and $B_i$ as inputs for purposes of processing other than signal regeneration. Circuit 4, therefore, has broader applications beyond mere regeneration. It can be understood to be a general input/output coupler unit for purposes of extracting information from the optical bus and for setting new information into that bus.

If the unit 5 as a whole operates as a signal regenerator, signal R is high (H) and signal S is low (L). The signal R is applied to two circuits 13 and 14 for providing a "AND"-function in combination with signals $A_i$ and $B_i$. Thus, the second input each of circuits 13 and 14 are respectively connected to the lines 10 and 11. The signal S is the gating signal for "AND" function circuits 19 and 20, respectively receiving the signals $A_o$ and $B_o$.

The outputs of circuits 13 and 19 are "OR'ed" in a circuit 15, the outputs of circuits 14 and 20 are "OR'ed" in a circuit 16. The outputs of these "OR"-function circuits operate respectively the switches 17 and 18. For R=H and S=L, as presently assumed, gates 13 and 14 are enabled while gates 19 and 20 are not. Thus, the switches 17 and 18 are controlled by the signals $A_i$ and $B_i$. Any signals $A_o$ and $B_o$ are disregarded.

The signal regenerating unit includes the transmitter circuit 22 to which is fed a current I. This current may originate in one or more of three current sources 21, 23, and 24. The outputs of current sources 21 and 23 are respectively controlled by the switches 17 and 18. These currents are respectively denoted $I_A$ and $I_B$. Source 24 furnishes permanently a current $I_C$ to the transmitter 22.

The circuit is designed to have switch 17 normally open (for an input L), and switch 18 is normally closed for an input L. It should be noted that details concerning the various logic and switching states are shown here by way of example only. The various gating functions are usually implemented by NAND and NOR circuits which, however, render explanations of information flow more cumbersome.

The current I passes through a switch 25 into a light-emitting diode 27; and depending upon the intensity of current I, light is emitted by this diode 27, appearing as the light signal $\phi A1$ in the curved portion of optical combining element 32. The "normal" condition for LED 27 is to be energized by the circuit $I_B+I_C$, resulting in an average optical output. Switch 25 is opened by a relay 26 for interrupting any current flow in LED 27 when a local fault detector responds.

In the regeneration mode, R=H and S=L, the two gates 13 and 14 are enabled, the gates 19 and 20 are disabled. Consequently, OR-gates 15 and 16 respectively transmit the signals in lines 10 and 11 which now control the state of the switches 17 and 18. The circuit connections and layouts are such that electronic switch 17 is closed when its input $A_i$=H (level in line 10 high), while switch 18 is open when its input $B_i$=H (level in line 10 being high). Going back to the table above, it appears that for $UL>UL_u$, both switches 17 and 18 are closed, and the current $I=I_A+I_B+I_C$. Both switches 17 and 18 are open when $A_i$=L and $B_i$=H for $UL>UL_l$, the current I is reduced to $I_C$. Switch 17 is open for $A_i$=L while switch 18 is closed for $B_i$=L. This is the illustrated state: $I=I_A+I_C$ in representation of an input UL in accordance with the relation $UL_l<UL<UL_u$.

It can thus be seen that a signal $\phi E$ arriving in bus 1 is split into two portions, one being received by transducing device 6 and processed in devices 8 and 9 in order to obtain a three-level signal LH or LL or HL. These dual- or two-bit logic signals control the switches 17 and 18 to, thereby, determine the current flow into LED 27, to be $I_C$ or $I_C+I_A$ or $I_A+I_B+I_C$. The resulting optical signal $\phi A1$ is set into branch 32 for transmission into fiber line 29. The optical signal is superposed upon the signal $\phi E2 \rightarrow \phi A2$. As will be shown below, the superposed, regenerated signal $\phi A1$ is the dominating component.

Each one of the various fiber optic connections establishes an attenuation of approximately 1 dB. Such attenuations occur in couplers 2 and 28 as well as in coupler 30. The signal regeneration by and in unit 4 far outweighs this reduction. In the case of a fault in unit 4, a recognition circuit opens a relay 26 which interrupts the current flow into the LED 27 so that there will be no more regeneration emissions; the signal $\phi A1$ is reduced to zero. The contour of output signal $\phi A$ still equals the contour of input $\phi E$ because of the through-component $\phi E2 \rightarrow \phi A2$; but due to the lack of regeneration, the latter is down by 7 dB. This will also be explained more fully below; suffice it to say presently that this through-component ensures uninterrupted information flow through the bus.

Proceeding briefly to the other modes, this unit may at times receive only. This "receive only" mode is established by R=L and S=L. This means that the gates 13, 14, 19, and 20 are all closed. Nothing is being fed to the transmitter 22 and branch 32. The signal $\phi E2$ is, however, coupled into branch 32 as signal $\phi A2$ for further transmission. Moreover, circuit 12 as receiving the signals $A_i$ and $B_i$ uses these signals as a signal destination for further internal processing.

The third mode of operation is a straight forward transmission, identified by R=L and S=H. Accordingly, gates 13 and 14 are blocked, while the locally produced signals $A_o$ and $B_o$ pass through gates 19 and 20, respectively, in order to control the switches 17 and 18. The signals $A_i$ and $B_i$ are either ignored, or processed locally. Conceivably, these signals are evaluated in a suitable processing facility, resulting in the generation of different signals which are the signals $A_o$ and $B_o$. As will be explained more fully below, the concurrent transmission of the "old" signals via the bypass coupling of branches 31 and 32 will not interfer since the signal, newly generated by the transmitter 22, prevails.

Figure 2:
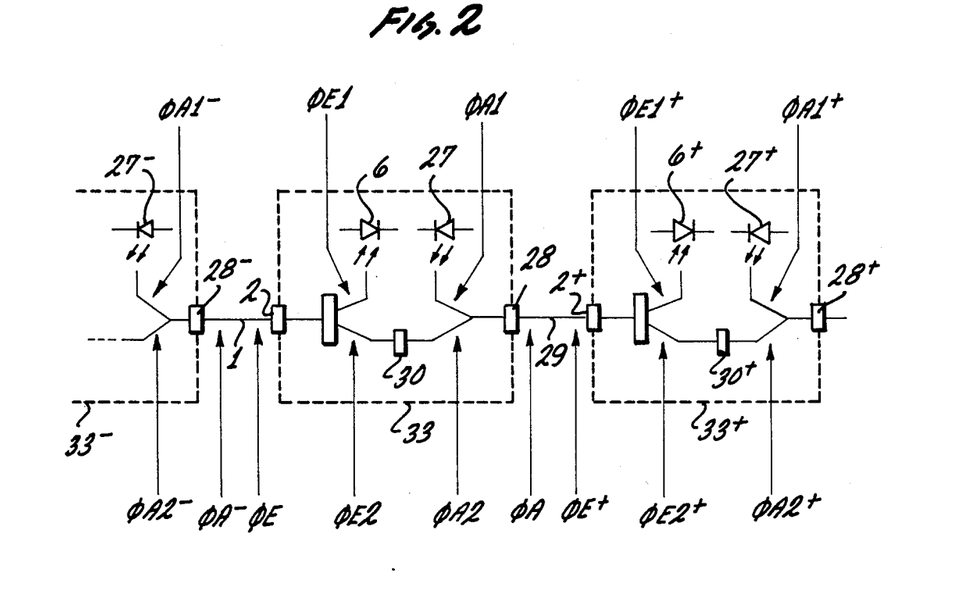
FIG. 2 is a schematic illustration of three units in a row on a bus.

FIG. 2 illustrates by way of example three participating units 33−, 33, and 33+; several components, as explained in reference to FIG. 1, have been shown and are identified by similar reference numerals, except that high indices (−) and (+) identify them as particular components in the different units. Unit 33− is coupled by fiber bus 1 to unit 33, and the latter feeds fiber bus 29 which, in turn, provides the input to unit 33+. Other units may follow, and other units may precede unit 33−. The entire arrangement may be connected in a recirculation or looping configuration so that, theoretically, information can circulate for indefinite periods of time in the bus until stopped and/or superseded by other information, as will be described.

It can, thus be seen that output coupler 28 receives two signals $\phi A2-$ and $\phi A1-$, the latter resulting from the operation of regenerating diode 27−. The arithmetic average of signals $\phi A1-$ is four times the arithmetic average of signal $\phi A2-$ due to the regenerative process in unit 33−. This corresponds to a signal boost by 6 dB of signal $\phi A1-$ relative to $\phi A2-$, which is the one coupled through. The combined, coupler-attenuated output $\phi A$ travels through a fiber optic 1 to the input coupler 2 of the next unit 33. The regeneration is, for example, chosen so that the strength of the signal that was applied to unit 33− is the same as the strength of signal $\phi E$ arriving at the coupler 2 of unit 33. It will now be explained how much regeneration is actually needed. This is best explained with reference to the middle unit 33. In other words, the postulate of a relative 6 dB increase by the regeneration will now be justified.

The signal $\phi E$ is attenuated by 1 dB in the plug connection 2. The signal is split into two optical components amounting to a signal drop by 3 dB per branch and an additional loss of 1 dB per branch. Thus, $\phi E1$ and $\phi E2$ each are down by 6 dB as compared with the sum of the signals $\phi A1-$ and $\phi A2-$ (neglecting any losses in fiber 1) or 5 dB down from input signal $\phi E$. The signals $\phi E2$ is attenuated by the coupler 30 by 1 dB so that the optical signal $\phi A2$ is down by 7 dB as compared with the combined signal $\phi A1- + \phi A2-$, or 6 dB down from $\phi E$. The arithmetic average or medium of signal $\phi A2$ equals 20% of the sum of the average values of the optical signals $\phi A1-$ and $\phi A2-$. In other words, the portion of the signal that is through-transmitted or bypassed by and in unit 33 ($\phi A2$) is down by 7 db (20%) as compared with the total signal strength as provided by unit 33− to its output coupler 28−. Thus, the regeneration in unit 33 must be such that this loss in signal strength is offset by the component $\phi A1$ which is added to $\phi A2$ before both pass output coupler 28.

The various units 33−, 33, 33+ are presumed to be of similar construction so that the arithmetic average of the emitting diodes 27−, 27, 27+ is the same in each instance. Thus, the arithmetic average of the optical signal $\phi A1$ as furnished by diode 27 is 6 dB up as compared with the arithmetic average of the optical signal $\phi A2$, always assuming that the fiber optics themselves provide negligibly small attenuation. This will be the case if the various lengths of the fibers are small. Otherwise, the regeneration must provide optical signals at still a higher level, which can be expressed by the condition that the regeneration signal $\phi A1$ must be more than 6 dB stronger than the through-component $\phi A2$.

Since we compare illumination powers, an attenuation by 6 dB amounts to a reduction of up to ¼th of the respective input. This then is the reason for a fourfold increase in intensity by the regenerating units. Any additional losses, of course, have to be compensated for by correspondingly higher outputs of the LED's.

The signal $\phi A1$ as generated by diode 27 in middle unit 33 is combined with the through-transmitted or bypass signal $\phi A2$, but the combined signals are attenuated by 1 dB in coupler 28. Following the transmission, further attenuation occurs in coupler 2+, and the signals $\phi E1+$ and $\phi E2+$ each are down by 3 dB so that particularly $\phi E1+$ is down by 4 dB from $\phi A$ (at the output side of coupler 28, i.e., the input to fiber bus 29). Thus, the signal strength pattern remains consistent if, indeed, each unit furnishes a 6 dB regeneration.

Figure 3:
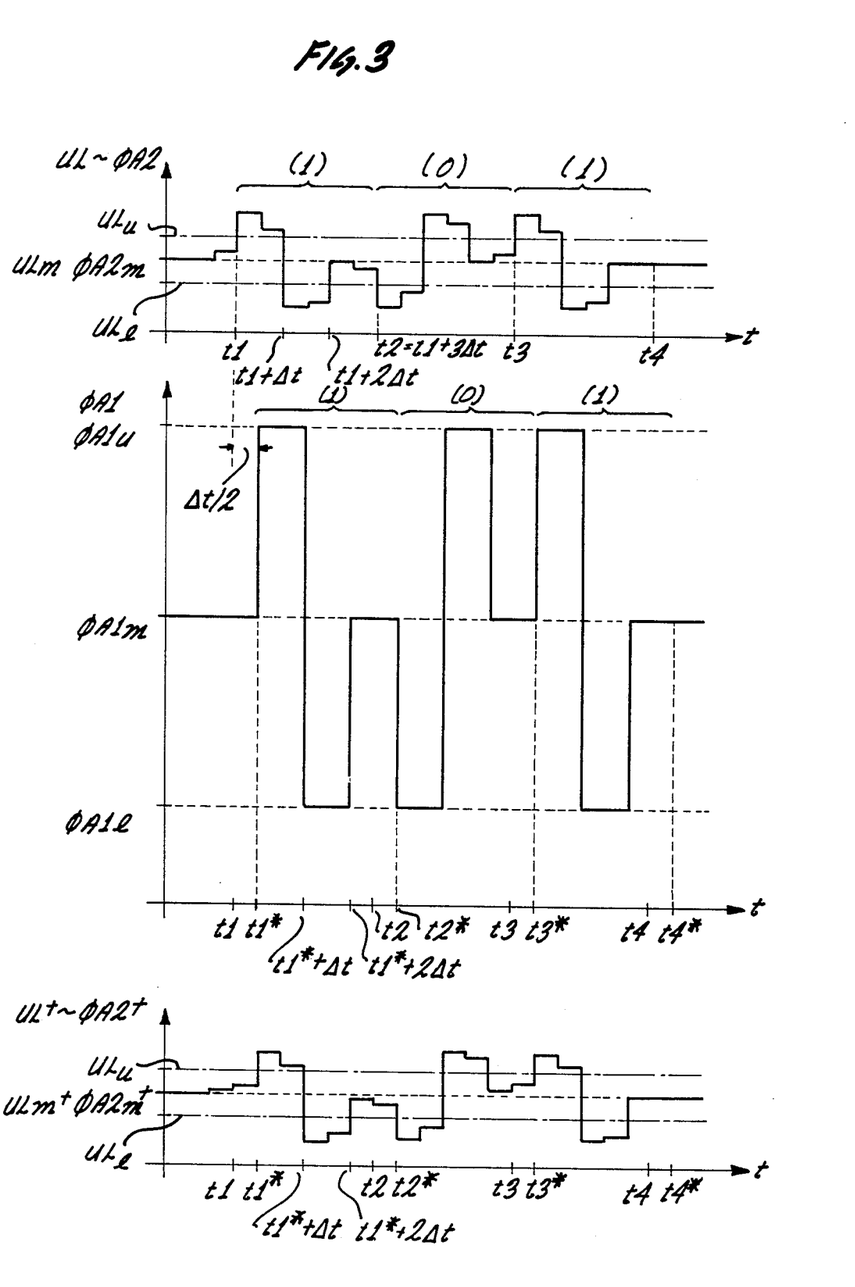
FIG. 3 illustrates operational diagrams, plotted against time on vertically aligned time scales and showing various signals as they occur in an operating unit as per FIGS. 1 and 2.

FIG. 3 now explains particulars of the generation of signals, commensurate with the component description above. The transmitted output signal $\phi A2$ is proportional to the voltage UL (upper diagram), and UL is generated by the respective transducers 6 in response to an input $\phi E1$ ($\phi E2 \sim \phi A2$ and $\phi E1 = \phi E2$). The middle diagram shows the reconstituted signal $\phi A1$, and the lower diagram shows the input voltage UL+ and the contour of the input and passed-through signal in the next unit, 33+.

As was explained earlier, the arithmetic average value of signal $\phi A2$ is down by 8 dB as compared with the arithmetic average of the sum of the optical signals $\phi A1-$ and $\phi A2-$ in the preceding stage (33−), or 7 dB down from $\phi A- = \phi E$. The contour of the signals in time are, however, identical. The same is true with regard to the optical signal $\phi E1$ and the voltage UL generated by the respective light detector 6. For this reason, it is quite appropriate to represent the signals $\phi A2$ and UL by the same curve, just the scaling differs. The arithmetic averages are respectively designated $\phi A2_n$ and $UL_m$.

The contour of the signal plotted in the top diagram of FIG. 3 is, thus, the same as the contour of the signal that unit 33⁻ has set into the bus 1. One can see that it is a composite step function signal with large steps and small steps. As will be explained next, the small steps result from the superposing process in the respective combining branch, the large steps constitute encoding information. The small steps are eliminated during regeneration in the respective next regenerating unit (i.e., 33 in the present example), the large steps are not only not eliminated, but emphasized.

The middle diagram in FIG. 3 illustrates the regenerated signal $\phi A1$, as produced by the LED 27 in the respective unit, e.g., unit 33, in response to the signal UL as per the upper diagram. This diagram is also well suited to explain the specific encoding format employed. As stated earlier, the basic aspect of the encoding format is the use of three signal levels. These three signal levels are used to bivalued bits "0" and "1" as follows. The three different levels, identified in the middle diagram of FIG. 3, are $\phi A1_l$, $\phi A1_m$, $\phi A1_u$, corresponding to the three current levels that can be fed into the LED 27. Let $\Delta\phi A1 = \phi A1_u - \phi A1_m = \phi A1_m - \phi A1_l$, and $\Delta\phi A1 = \alpha \phi A1_m$, one obtains the relations $$\phi A1_u = \phi A1_m(1+\alpha)$$

$$\phi A1_l = \phi A1_m(1-\alpha)$$

FIG. 3 is plotted with $\alpha = \frac{2}{3}$. It is important that $\alpha$ is an invariant factor and, this way, one obtains a specific relation between the three levels.

A binary "zero" is represented in this scheme by three equally long pulses of a duration $\Delta t$ each. The first pulse has a level $\phi A1_l$, the second one has $\phi A1_u$, and the third has the level $\phi A1_m$. A binary "one" is also represented by three equally long pulses of the duration $\Delta t$ each, of which the first one has the level $\phi A1_u$, the second one has the level $\phi A1_l$, and the third is again at level $\phi A1_m$. Whenever no encoded information is transmitted, $\phi A1 = \phi A_m$. FIG. 3 shows a "one", followed by a "zero", followed by a "one" and, thus, in toto represents the binary bit sequence (1, 0, 1).

As stated, the signal in the upper diagram of FIG. 3 can be interpreted in different ways. When construed as voltage, it represents the electric regenerating input UL; when construed as optical signal, it represents the optical signal that arrives at a regenerating unit, and a portion of that signal (namely $\phi A2$) is passed through. Presently, we consider primarily the fact that this signal represents the electric input for the three-level discrimination circuit 8. The threshold levels in that circuit 8 are now selected as follows. As stated, these threshold levels vary with the arithmetic average $UL_m$ of the input UL.

$$UL_u = UL_m(1+\alpha/2)$$

$$UL_l = UL_m(1-\alpha/2)$$

wherein $\alpha$ is the factor introduced above. For $\alpha = \frac{2}{3}$, one obtains the threshold levels:

$$UL_u = 4/3 UL_m$$

$$UL_l = 2/3 UL_m$$

It must now be realized that this signal train as per FIG. 3, upper diagram, represents the bit sequence (1, 0, 1) already in the stated encoding format. Accordingly, the upper diagram of FIG. 3 shows that UL exceeds the upper threshold $UL_u$ at the time $t_1$. The diagrams of FIG. 3 are drawn to a vertically aligned time scale. After a certain process time in electronics 4 and electronic transit delay (assumed to be $\Delta t/2$), the signal $\phi A1$ is produced by the respective LED and jumps from level $\phi A1_m$ to level $\phi A1_u$ (time $t_1^* = t_1 + \Delta t/2$). The new signal level is produced by the LED 27 in response to signal UL. Since the upper diagram of FIG. 3 is the electric input for the regeneration, and the middle diagram is the optical output of that regeneration process, the critical signal flanks and edges of that input signal are phase-shifted by $\Delta t/2$ to the output signal $\phi A1$. It is important to note that the small steps in the input signal are being eliminated by this regeneration process because the small steps still retain the signal level of a single pulse above or below the particular threshold. Presently, and for the first pulse, that threshold level is $UL_u$.

At $t_1 + \Delta t +$ signal UL (upper diagram) drops below the lower threshold $UL_l$ at $t_1^* + \Delta t = t_1 + \Delta t/2 + \Delta t$. The optical output $\phi A1$ (middle diagram) drops from $\phi A1_u$ to $\phi A1_l$. At $t_1 + 2\Delta t$, UL exceeds lower threshold level $UL_l$, but does not reach $UL_u$. Accordingly, the optical regeneration signal $\phi A1$ returns to the level $\phi A1_m$ at the time $t_1^* + 2\Delta t = t_1 + \Delta t/2 + 2\Delta t$.

At $t_2 = t_1 + 3\Delta t$, the input voltage UL to the regeneration drops again below $UL_l$; the optical output $\phi A1$ drops from $\phi A1_m$ to $\phi A1_l$ at the time $t_2^* = t_2 + \Delta t/2$.

The three pulses between $t_1$ and $t_2$ (or between $t_1^*$ and $t_2^*$) represent a binary "1." The three pulses between $t_2$ and $t_3$ (or between $t_2^*$ and $t_3^*$) represent a binary "0." The pulses between $t_3$ and $t_4$ (or between $t_3^*$ and $t_4^*$) represent another "1."

The curve plotted in the lower diagram of FIG. 3 is the result of superposing $\phi A2$ as per the upper diagram and $\phi A1$ as per the middle diagram. These two diagrams are drawn to a comparable scale; the scale as per the lower diagram appears connected, but it shows, in fact, the superpositoning of the signals $\phi A1$ and $\phi A2$ as attenuated by the output coupler 2⁺, by the attenuation as it occurs in the branching unit 31⁺ as well as in the coupler 30⁺ of that next unit 33⁺. The signal, thus plotted in the lower diagram of FIG. 3 is the signal $\phi A2^+$ in that next unit. However, the contour of that signal is exactly as provided by and in unit 33 upon superimposing the optical signals as per the upper and the middle diagrams! Signal $\phi A2^+$ is attenuated by 7 dB as compared with $\phi A1$ (upper diagram) and $\phi A2$ (middle diagram) combined. A 7 dB attenuation is equivalent to an amplitude reduction to 20%.

This next unit 33⁺ generates again its voltage $UL^+$, which has the same contour as the signal $\phi A2^+$. Also, the arithmetic average used in that unit and in the particular three-level to two-threshold processing circuit 8 therein is analogously used to generate the threshold levels $UL_m^+ (1 + \alpha/2)$ and $UL_m^+ (1 - \alpha/2)$. However, the coefficient α may be a different one if other, additional attenuating conditions occur.

It shall now be considered that one or more regenerating units have dropped out. The respective fault detector has triggered the respective relay 26 which, in turn, opens contact 25 to, thereby, interrupt current flow into the respective LED 27. Thus, that particular unit passes only the optical signal φA2 to the next unit.

The signal UL and the arithmetic average thereof in that next unit is correspondingly smaller, but the threshold levels used by circuit 8 in that next unit track the average so that the signal regeneration is faithfully carried out, just within a smaller range of electric signal levels at the input side of circuit 8.

Figure 4:
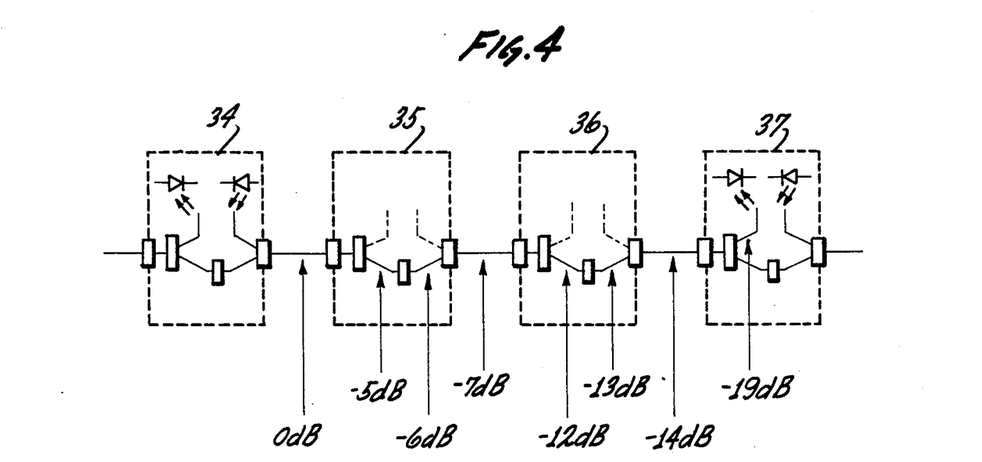
FIG. 4 illustrates a four-unit system in which two units are down; the figure shows by way of example signal levels in such a system.

FIG. 4 is an example of a case in which two regenerating units in series have dropped out. The four units are denoted 34, 35, 36, and 37. The optical signal that issues from the (operative) unit 34 is properly composed of a through-transmitted component and of a regenerated component. In each of the units 35 and 36, regeneration does not occur; but the through-transmitted and bypass signal is attenuated by 7 dB in each case. Thus, the optical signal that arrives in unit 37 is down by 19 dB as compared with the optical signal that left unit 34. The unit 37 reconstitutes the signal completely because it is not an amplifier with a fixed gain; its output source 27 generates an optical signal having the same strength as generated in any other operational unit; and the faithful threshold tracking ensures that the relative relation among the various signal levels is maintained. The units are, for example, designed to respond to signals that are attenuated up to 28 dB (optical) or 56 dB electrical. This means that in the case of two unit failures, the losses in the transmissions as such can still be up to 9 dB. These losses have been neglected above for simplifying the analysis. If, in fact, these losses are negligibly small, even three units in a row can drop out. If a still larger failure rate is to be accommodated, then the sensitivity of the electronics must be improved further, though it will be appreciated that at one point an unfavorable S/N ratio may preclude accommodation of still larger failure rates.

Figure 5:
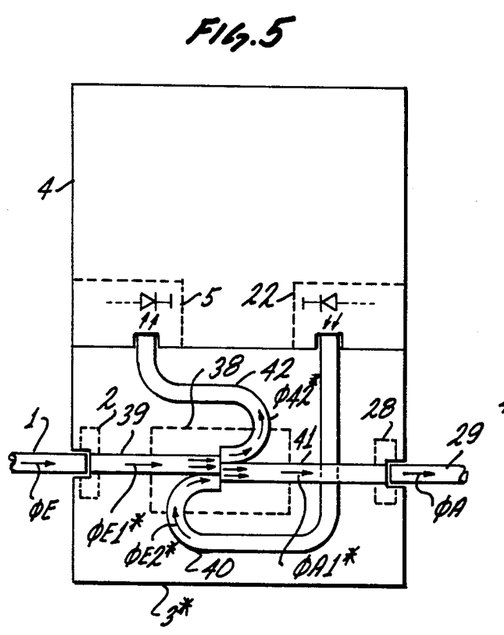
FIG. 5 is a schematic view of a modification of the optical portion in the unit shown in FIG. 1, being somewhat more complex, but achieving a higher optical gain.

FIG. 5 illustrates a modification of the unit shown in FIG. 1. The electronic portion is identical (4), but the optical unit, here 3*, is modified. Reference numeral 38 refers to a socalled cross-coupling unit having two optical inputs, 39 and 40, and two outputs, 41 and 42. The short fiber element 39 is directly and fully coupled to input fiber 1, via coupler 2, and feeds the signal φ*E1 into the cross-point, for a 50% passage each into fibers 41 and 42. φ*E1 is 1 dB down from input φE. The split results in a 3 dB drop per component, and the fiber-to-fiber coupling produces a 2 dB attenuation due to optical losses. Thus, the signal φ*A2, which passes into fiber 42, and the optical signal set from 39 into 41; each are attenuated by 5 dB from the level of signal φ*E1.

The regenerated signal φ*E2, arriving in fiber 40 at the cross-coupling 38, is coupled only to fiber 41 and not to fiber 42. Thus, φ*A1 is the composite of cross-coupler-attenuated φ*E1 and φ*E2, the coupler attenuation being 5 dB in total. The output coupler 28 produces another 1 dB attenuation.

Figure 6:
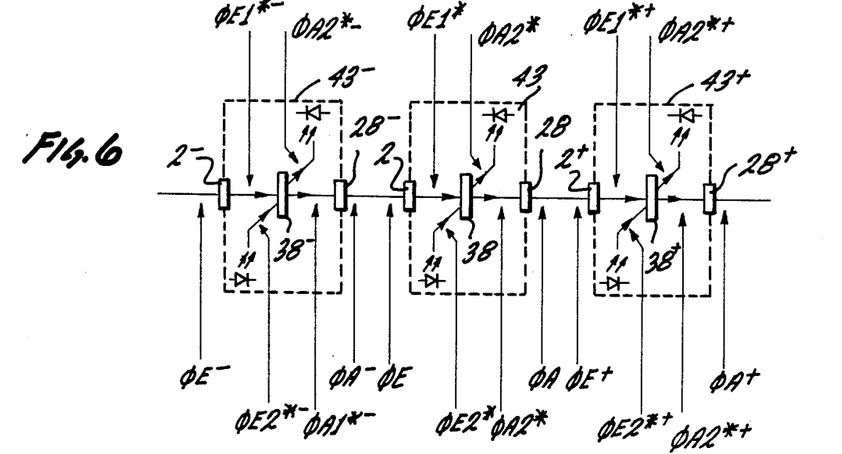
FIG. 6 is a view similar to FIG. 2, but with optical portions as per FIG. 5.

FIG. 6 now explains the effect of a chain of units, each having its optical part constructed as per FIG. 5. The units are designated 43−, 43, and 43+; the electrical portion is constructed as per FIG. 1 in each instance. Considering the attenuations as outlined above; the arithmetic average of the regenerated optical signal φ*E2 is 6 dB higher than the arithmetic average of optical signal φ*E1. In the case of a dropout of, e.g., unit 43, the optical regeneration signal φ*E2 is zero, and the optical signal φA is down by 7 dB from optical signal φE (rather than 9 dB as per the example above). Again, two or even three units in a row can drop out without endangering the desired transmission of information. The combined attenuation of the superposed signals φ*E1 and φ*E2 (a) in the cross-coupler 38, (b) in the couplers 28 and 2+, and (c) the losses in the fiber from unit 43 to unit 43+, must be at least 1 dB higher than the ratio of the illumination power S of signals φ*E1 and φ*E2. It does not matter how the attenuation is distributed among the components. In the examples, shown in FIGS. 1 to 4, the signals φA1 and φA2 are presumed to have a power ratio of 6 dB; and for the signals φ*E2 and φ*E1, as per FIGS. 5 and 6, the same 6 dB ratio is presumed. In all of these cases, the electrical component can readily regenerate the information that is to be transmitted.

Figure 7:
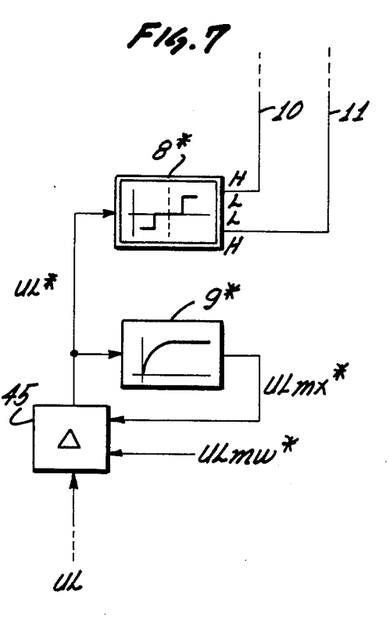
FIG. 7 is a block diagram of a modification in the electronic circuit of the unit as per FIG. 1.

The combined stages 8 and 9 in FIG. 1 cause a dynamic adaptation to a varying arithmetic average value $UL_m$; the thresholds track that value so that the logical output of circuit 8 remains invariant to a level change at the input side. FIG. 7 illustrates a modification in which signal UL operates by automatic gain control. The signal UL is fed to an amplifier 45 whose output UL* is determined by a variable gain. The gain is controlled by the delay and averaging circuit 9*. This circuit forms the average $UL_{mx}^*$ of amplifier output UL*. The amplifier 45 increases the voltage UL until the arithmetic average $UL_{mx}^*$ of voltage UL* equals a fixed reference value $UL_{mw}$. The threshold values in circuit 8* are fixed and determined as per the following relations:

$$UL_u^* = UL_{mw}^* (1 + \alpha/2)$$

$$UL_l^* = UL_{mw}^* (1 - \alpha/2)$$

This circuit **45-8*-9* can replace the circuit 8-9** in FIG. 1; the result is the same. The response and signal processing vis-à-vis thresholds remains invariant to changes in average signal level changes at the input side. In the first case (FIG. 1), the thresholds are caused to track the average input signal level; in the other case (FIG. 7), the average is modified until matching a fixed reference value in relation to which the thresholds bear fixed ratios.

The entire bus may be arranged in a loop. In this case, regeneration by the primary transmitter unit may not be desired. Thus, its mode circuit 12 provides signals R=S=L. Switch 17 is, thus, open and switch 18 is closed, and the LED 27 produces a constant output φA1$_m$. This signal is superimposed upon the arriving and recirculated signal φA2 and is on the average 6 dB or more smaller than φA1$_m$. Thus, the signal UL, now produced in the succeeding stages, remains between the two thresholds. After the transmitting unit has thus received its own signal and has de facto suppressed further transmission, the mode changes to H and L (or to L and H) so that the unit can again participate in regeneration or function as primary transmitter. In that case, the through-transmitted optical signal in a unit is superimposed as noise upon the now newly generated optical signal. That noise is suppressed in the next regeneration stage because, as long as a generated or regenerated signal exists as per any unit, the respective next unit will only "see" that signal and ignore the superimposed component that was through-transmitted in the preceding unit. Only when a unit does not generate or regenerate, will the through-transmitted component be "elevated" to an information signal in the next unit, or even in the next unit thereafter.

The invention is not limited to the embodiments described above; but all changes and modifications thereof, not constituting departures from the spirit and scope of the invention, are intended to be included.

We claim:

1. In an optical transmission system, having a plurality of signal-regenerating units, at least one of said units including:

an optical branching unit having a first portion in order to provide attenuated through-transmission of a portion of an optical signal received, this through-transmission continuing irrespective of failure of said unit; a second portion extracting a component from the received optical signal; and a third portion for reintroducing an optical signal and combining it with the through-transmitted signal, there being first circuit means for converting the extracted portion into an electrical signal, there further being a source for producing radiation, the radiation being a reconstituted signal, the improvement comprising:

second circuit means connected to the first circuit means and responsive to the contour of the electrical signal representing a three-level-per-bit code, the middle level corresponding to nonzero light, but also to a zero data flow condition when persisting, and producing multi-bit logic signals wherein a particular bit combination represents said middle level, the second circuit means including threshold means providing two threshold levels against which said electrical signal is referenced and having values respectively larger and smaller than an average of said electrical signal which average corresponds to a signal produced in the absence of data, in order to distinguish between three ranges for the electrical signals, resulting in three distinct logic states, the second circuit means further including circuit means (i) responsive to the average of said signal, and circuit means (ii) for shifting the threshold values up or down, corresponding to changes in the average; and third circuit means connected to be responsive to the logic signals as sequentially provided and producing a three-level control for the radiation as produced by the said source, the middle level when persisting representing absence of reconstituted data.

2. In a system as in claim 1, said first circuit means including a variable gain amplifier, the circuit means (i) being further connected to an output of said amplifier for varying the gain thereof in order to maintain the average output of the amplifier constant, the threshold means providing the two fixed thresholds with reference to which the amplified electrical signal is processed.

3. In a system as in claim 1, and including fault detection means connected for inhibiting production of a reconstituted signal upon detection of a fault in the unit.

4. In a system as in claim 1, said optical branching unit including a branch having an optical input and two optical outputs, and a combining unit including two optical inputs and an optical output, one of the two outputs being coupled to one of the two inputs, this one input and one output constituting said first portion, the other one of the two outputs being said second portion, being optically coupled to a light detector being a part of the first circuit means, the other one of the two inputs being optically coupled to said source and being a part of said third portion.

5. In a system as in claim 1, said optical branch being a cross-coupling unit with two inputs respectively connected to said source and to receive said optical signal, and having two outputs respectively coupled to a light detector included in said first circuit and coupled for providing a combined through-transmission and regenerated output.

6. In an optical transmission system, comprising:

means for producing a three-level optical signal, wherein a middle level is equal to an arithmetic average of the signal as a whole, and each digital data bit is represented by a particular combination of all three levels;

means for branching a portion of said signal, comparing it with two thresholds and providing a multi-bit logic control signal in response thereto;

means connected to be responsive to said logic signals in order to generate an optical signal having a similar contour as said branched portion, a particular bit combination of the control signal representing the said average, which persists in the absence of data; and means for optically combining the generated signal with a remaining portion of said signal.

7. In a transmission system as in claim 6, wherein said remaining portion is through-transmitted independent from any generation of said optical signal.

8. In a transmission system as in claim 6, including circuit means for detecting said arithmetic average separately and providing for a fixed relation therewith to said two thresholds.

9. In a transmission system as in claim 8, the circuit means including automatic gain control means in order to maintain an output, having a constant average signal level, for purposes of said comparing.

10. In a transmission system as in claim 8, the circuit means including means causing said two thresholds to track an average signal level of said branched portion.

11. In an optical transmission system, a signal regenerating unit, comprising:

first circuit means responsive to an optical signal and providing an electrical signal;

second circuit means connected to the first circuit means and providing a plurality of threshold levels, including circuit means for referencing the electrical signal to the threshold levels and providing groups of logic signals;

third circuit means connected to be responsive to an average level of the electrical signal and further connected for maintaining a fixed relation between an average of the electrical signal as referenced in said second circuit means and said threshold levels therein; and means responsive to said groups of logic signals in order to provide a regenerated optical output.

12. In an optical regenerating system, comprising:

a first optical branching unit having a first and a second output branch and a common input for receiving an optical signal to be regenerated, such an optical signal varying between three levels per bit;

a second optical branching unit having a first and a second input branch and a common output branch, said first output branch and said first input branch being permanently interconnected for passage of a signal;

a light detector disposed to be responsive to an optical output of said second output branch and providing an electrical output, representing the optical signal to be regenerated;

circuit means connected to the light detector and comparing an electrical signal representing the electrical output with two threshold levels, corresponding to three signal ranges separated by these levels, and providing a multi-bit digital output; and electrically controlled, optical output means responsive to each said multi-bit digital output and providing for each such bit combination one of three optical output levels as regenerated output to said second input branch.

13. In a system as in claim 12, the circuit means including means for maintaining a constant relation between said threshold levels and the electrical signal so that the production of said digital output remains invariant to average range changes of the electric output as produced by the light detector.

14. In an optical regenerating device, comprising:

means responsive to a received optical signal and providing an electrical signal representative thereof;

circuit means connected to receive the electrical signal and referencing it against two thresholds, including dynamic range means for maintaining a fixed relation between the average of the signal and the thresholds, the circuit means providing logic signals representing an information content of the electrical signal as referenced; and circuit means alternatively adjustably responsive to said logic signals and to other logic signals for controlling a light source in order to provide a regenerated optical signal representing said optical signal as received, but at a higher power level.

* * * * *